United States Patent
Checco

(10) Patent No.: US 7,509,686 B2
(45) Date of Patent: Mar. 24, 2009

(54) METHOD FOR PROVIDING COMPUTER-BASED AUTHENTICATION UTILIZING BIOMETRICS

(76) Inventor: John C. Checco, 33 Captain Faldemeyer, Stony Point, NY (US) 10980-3463

( * ) Notice: Subject to any disclaimer, the term of this patent is extended or adjusted under 35 U.S.C. 154(b) by 1083 days.

(21) Appl. No.: 10/768,616

(22) Filed: Jan. 30, 2004

(65) Prior Publication Data

US 2004/0187037 A1 Sep. 23, 2004

Related U.S. Application Data

(60) Provisional application No. 60/444,420, filed on Feb. 3, 2003.

(51) Int. Cl.
*H04L 9/32* (2006.01)
(52) U.S. Cl. ............... 726/27; 726/3; 713/186
(58) Field of Classification Search ............... None
See application file for complete search history.

(56) References Cited

U.S. PATENT DOCUMENTS

| | | | | |
|---|---|---|---|---|
| 4,621,334 A |   | 11/1986 | Garcia ................. | 364/550 |
| 4,805,222 A | * | 2/1989 | Young et al. .......... | 382/115 |
| 4,962,530 A | * | 10/1990 | Cairns ................. | 713/183 |
| 4,998,279 A | * | 3/1991 | Weiss ................. | 340/5.52 |
| 5,034,898 A | * | 7/1991 | Lu et al. .............. | 706/62 |
| 5,056,141 A | * | 10/1991 | Dyke ................. | 340/5.27 |
| 5,557,686 A | * | 9/1996 | Brown et al. ......... | 382/115 |
| 6,092,192 A | * | 7/2000 | Kanevsky et al. ...... | 713/186 |
| 6,151,593 A | * | 11/2000 | Cho et al. ............ | 706/16 |
| 6,311,272 B1 | * | 10/2001 | Gressel .............. | 713/186 |
| 6,442,692 B1 |   | 8/2002 | Zilberman ............ | 713/184 |
| 6,618,806 B1 | * | 9/2003 | Brown et al. ......... | 713/186 |
| 6,895,514 B1 | * | 5/2005 | Kermani .............. | 726/19 |
| 7,206,938 B2 | * | 4/2007 | Bender et al. ........ | 713/186 |
| 7,260,837 B2 | * | 8/2007 | Abraham et al. ...... | 726/4 |

OTHER PUBLICATIONS

Meszaros, Attila, Banko, Zoltan, Czuni, Laszlo, "Strengthening Passwords by Keystroke Dynamics," Sep. 8, 2007, IEEE International Workshop on Intelligent Data Acquisition and Advanced Computing Systems: Technology and Applications, pp. 574-577.*
Biometrics "Signature Recognition and Keystroke Dymamics," Ch. 6, pp. 106-112 Dec. 2002.

\* cited by examiner

*Primary Examiner*—Kaveh Abrishamkar
(74) *Attorney, Agent, or Firm*—Borque and Associates

(57) ABSTRACT

A method and system looks for patterns in a series of data samples to determine consistency or inconsistency within the data sample. One embodiment includes computer authentication using a unique biometric algorithm that provides biometrically enhanced computer-based authentication using a software only solution. In this embodiment, the system and method provides a mechanism to gather user keystroke timing data, and to analyze and abstract the data into a non-repudiated template against which future keystroke timings can be verified.

19 Claims, 3 Drawing Sheets

TCP:1 = 2N-1
TCP:2 = 2N-2
TCP:b = 2N-b
TCP = B2N - B!

METHOD FOR PROVIDING COMPUTER-BASED AUTHENTICATION UTILIZING BIOMETRICS

CROSS-REFERENCE TO RELATED APPLICATIONS

This application is related to and claims the benefit of U.S. Provisional Patent Application No. 60/444,420 entitled A Method For Providing Computer-Based Authentication Utilizing Keystroke Heuristics, filed on Feb. 3, 2003 and fully incorporated herein by reference.

TECHNICAL FIELD OF THE INVENTION

The present invention relates to computer authentication and more particularly, to a unique keystroke biometric algorithm that provides bio-metrically enhanced computer-based authentication using a software only solution thereby providing a mechanism to gather user keystroke timings, which can analyze and abstract the data into a non-repudiated template against which future keystroke timings can be verified.

BACKGROUND OF THE INVENTION

Keystroke biometrics (also referred to and known as keystroke dynamics) generally refers to the act of user authentication based not only on what a user types, but how the user types. Some experts classify this technology as a behavioral rather than a physical biometric. "Behavioral biometrics" refers to the collection, classification, storage, retrieval, and dissemination of recorded actions of a user. Whereas "physical biometrics" refers to the statistical analysis of biological observations and phenomena. In layman's terms, physical biometrics provides an absolute measurement of biological aspects of a user that determine identity, such as DNA, Retina, Fingerprint and Vein structure.

Behavioral biometrics provides a confidence measurement of characteristic traits exhibited by a user that can determine identity, such as speech Recognition, Handwriting Analysis and Keystroke Biometrics.

Biometrics recognizes that we are all different in our physical makeup, and it is possible to identify people based on these differences. Hair color, height, and the sound of a voice are all examples of how people are different from each other. Combined, these differences create our identity and make us unique from each other. Biometrics measures aspects of our make-up, and uses those measurements in order to identify us.

Currently, there exists a wide array of authentication systems ranging from high-risk, such as userid/password plaintext authentication, to low-risk hardware-based iris and fingerprint biometric recognition systems. In addition, there are existing academic as well as commercial algorithms for keystroke-dynamics. Further background information on this subject is available from "Technical Report" BioPassword Keystroke Dynamics made available from Net Nanny Software International Inc. attached hereto and incorporated herein by reference.

Most low-risk biometric (as well as bio-informatics) authentication systems involve use of specialized hardware that must capture/translate/verify user characteristics. This increases the costs of deployment and maintenance; thus reducing Return On Investment (ROI). Other keystroke dynamics algorithms are limited to very specific hardware and/or software requirements. Most are optimized to serve a single static function, and provide a narrow (if any) band of flexibility. Prior art technology deployed by BioPassword (a subsidiary of BioNet Systems, LLC) of Washington, USA, relies on an external existing keyboard to produce a digital measurement binding it to a standard user id and password procedures.

Typing biometrics, often referred to as keystroke dynamics, examines the way in which a user types or pushes keys on a keyboard. This method is based on the typing characteristics of the individuals such as durations of keystrokes, and latencies between keystrokes, inter-keystroke times, typing error frequency, force keystrokes, etc. Specifically, keystroke dynamics measures two distinct variables: "dwell time" which is the amount of time you hold down a particular key and "flight time" which is the amount of time it takes a user to travel between keys. These variables are sometimes referred to as a user's "rhythm".

Because keystroke biometrics uses hardware already found in most computer systems—the keyboard—this solution can be considered a software-only solution. The cost of deployment and maintenance are greatly reduced; thus consumers can get a very early ROI. For example, there is no physical client-side deployment for installations or upgrades, users are not limited to individual or specific workstations, such an implementation supports server and/or workstation managed levels of security, software components allow integration into multiple projects and users may adjust acceptance/enrollment parameters.

SUMMARY OF THE INVENTION

This invention provides a method and system for gathering data or samples, such as user keystroke timings, analyzing and abstracting the data into a non-repudiated template against which future data or samples can be verified. The invention includes the acts of Data Capture; Template Creation From Enrollment Data; Signature Verification; Template Update From Signature Data; Nonce Profile Creation/Update; and Template Creation From Nonce Profile.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
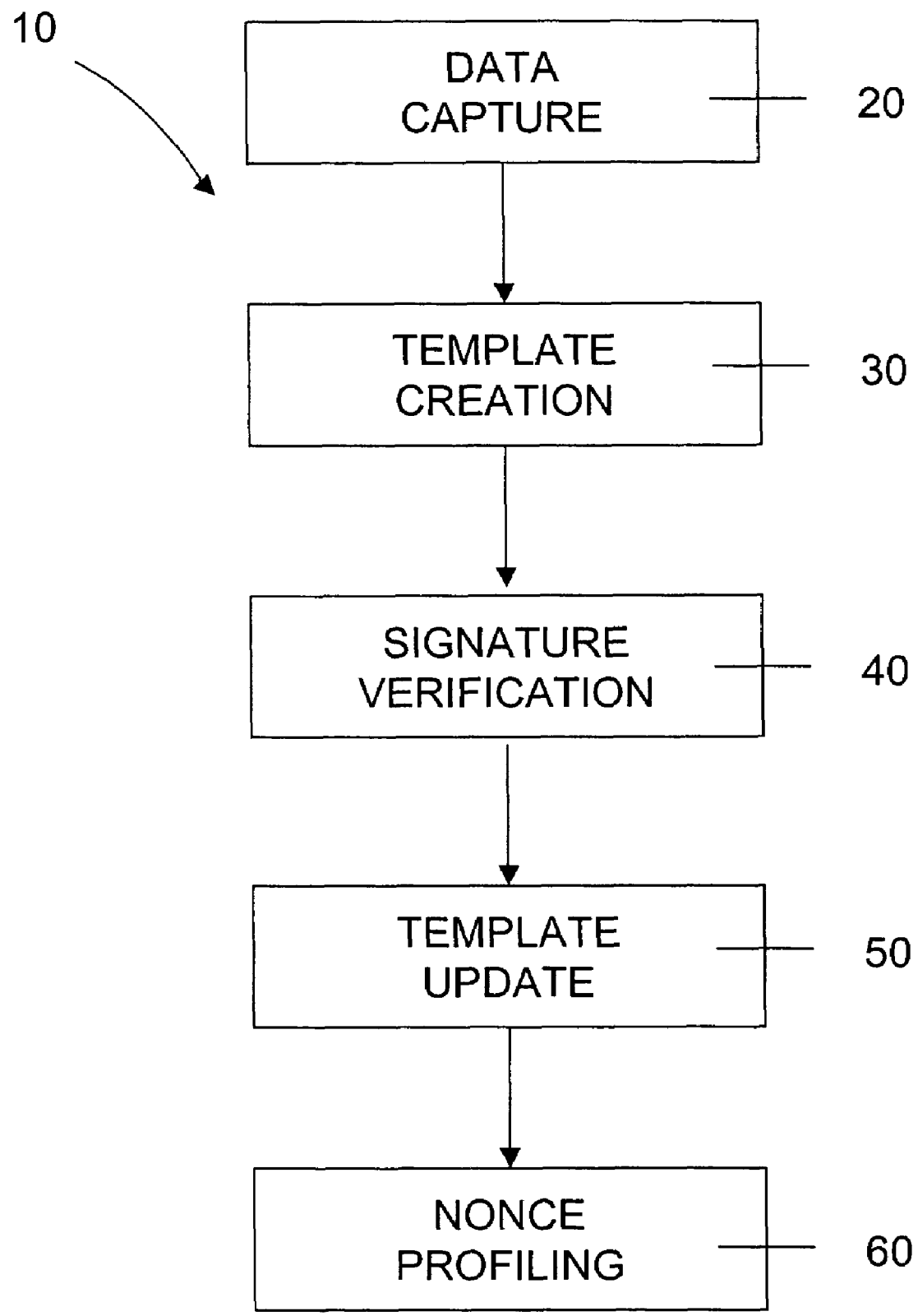
FIG. 1 is a flow chart of the method for providing computer-based authentication utilization biometrics according to the present invention.

The present invention is a method for providing computer-based authentication and/or pattern recognition in a data sample utilizing biometrics 10, FIG. 1. The method includes the acts of data capture 20, template creation 30, signature verification 40, template update 50, and nonce profiling 60.

Although the present invention will be explained in relation to keystroke pattern recognition, this is not a limitation of the present invention. The present invention looks for patterns in a series of samples to determine consistency or inconsistency within the data sample. Radio signals, animal calls or any other series of numbers or samplings can benefit by the methods disclosed by the present invention.

The first act in the method for providing computer-based authentication utilizing keystroke biometrics is data capture 20. To capture data 20 to be processed according to the present invention, a passphrase 70, FIG. 2., for plaintext authorization is created. As or after a user types the passphrase, keystroke timestamps are determined, and the keystroke timestamps are used along with other information to determine keystroke biometrics of the user. Keystroke timestamps include, for example, absolute keystroke timing data which may include a serialized set of keystroke timings. The set of keystroke timings is typically selected from the following types of any timing differential between: one key's depression and any key's release; one key's depression to any other key's depression; one key's release to any other key's depression; and one key's release to any other key's release.

Figure 2:
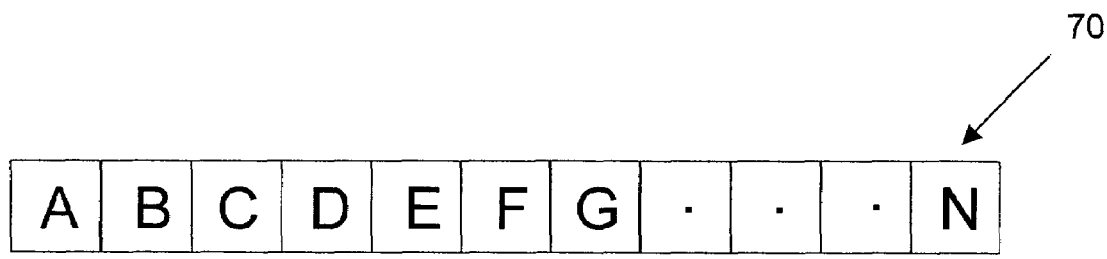
FIG. 2 is an exemplary passphrase for plaintext authentication from which keystroke characteristics are gathered according to the present invention.

FIG. 2 is an exemplary passphrase 70 for plaintext authentication from which keystroke characteristics are gathered according to the present invention.

Figure 3:
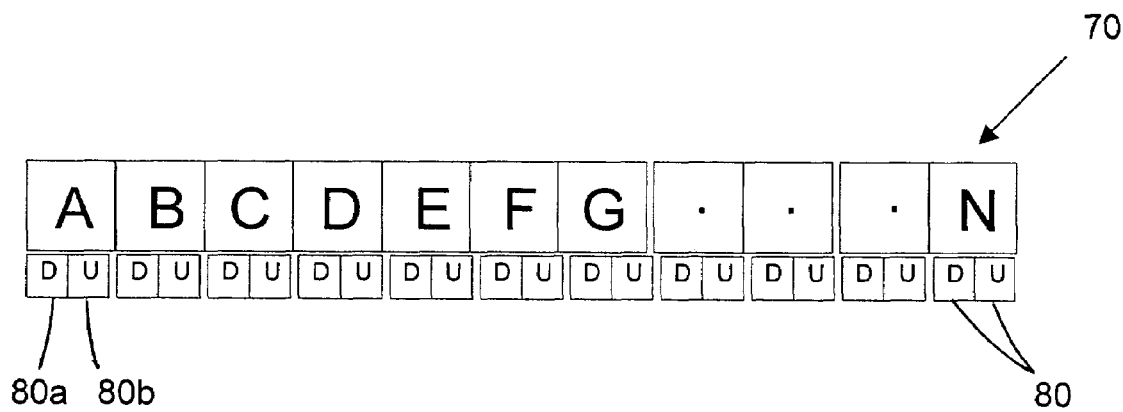
FIG. 3 is the exemplary passphrase for plaintext authentication showing timestamps thereon according to FIG. 1.

FIG. 3 is the exemplary passphrase 70 for plaintext authentication according to FIG. 2 showing timestamps 80 thereon. To support biometric analysis, all algorithms must capture the timestamp when a key is pressed 80a and the timestamp when a key is released 80b. Specifically, the time between a single key's press 80a and release time 80b is called dwell time 90a. The time between one key release 80b and the next key press 80a is called travel or flight time 90b (hereinafter "flight time") as shown in FIG. 4.

Figure 4:
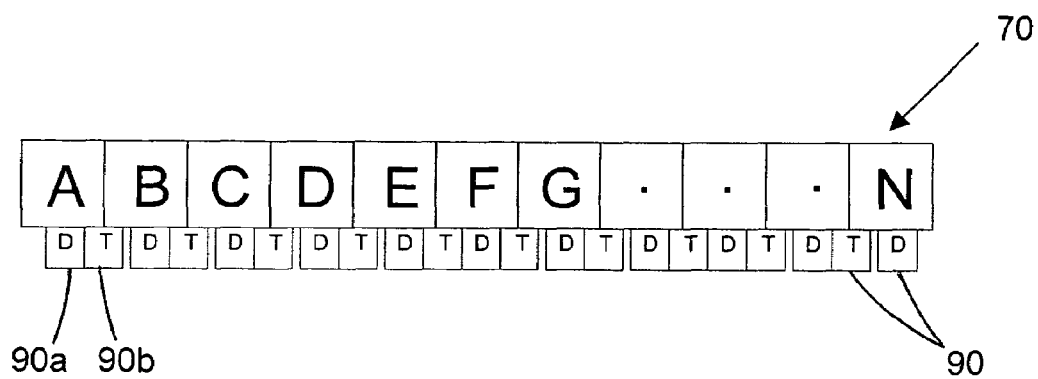
FIG. 4 is the exemplary passphrase for plaintext authentication showing dwell and flight times thereon for traditional interval calculations according to FIG. 1.

FIG. 4 is the exemplary passphrase 70 for plaintext authentication showing the timestamp data, which is abstracted further. Most algorithms use this data to calculate either relative or absolute timing. The present invention utilizes an algorithm that uses absolute timings. For this type of data, an algorithm mathematically obtains 2N−1 total calculation points (TCPs) where "N" is the number of characters in the passphrase.

The second act in the method for providing computer-based authentication utilizing keystroke biometrics according to the present invention is the creation of a template 30. There is an enrollment period during which time a user types the passphrase 70. The user is required to type the passphrase 70 a number of times. During the enrollment period, multiple data timings are obtained. This data is abstracted into a template for later verification. The details of template creation 30 are proprietary to each algorithm and described further herein below. In addition, U.S. Pat. Nos. 4,805,222 and 6,442,692 are examples of other keystroke template creation algorithms.

The third act in the method for providing computer-based authentication utilizing keystroke biometrics according to the present invention is signature verification 40. As will happen with most algorithms, the data timings for a passphrase 70 are gathered only once during authentication and sent to a processing engine for verification. The details of signature verification 40 are proprietary to each algorithm and examples are disclosed herein below as well as in U.S. Pat. Nos. 4,805,222 and 6,442,692 which disclose examples of other keystroke verification algorithms.

The fourth act in the method for providing computer-based authentication utilizing keystroke biometrics is updating the template 50. Unlike other algorithms, the present invention provides the capability of embedding a signature (i.e., additional data timings) into an existing template to increase the "strength" or accuracy of the template. The strength of the template is increased by increasing the sample size of data timings from which the template is created.

The present invention has unique features including a new set of algorithms. Specifically, the algorithms of the present invention utilize an extended breadth of timing data. Traditionally, most prior art algorithms work on adjacent keystroke data timings to provide biometric analysis. In contrast, the present invention defines multiple degrees and more total calculation points than traditional algorithms. Further and contrary to traditional algorithms, the present invention does not make distinctions between timings that are key presses 80a or key releases 80b. The present invention uses timings that are done by "breadth" (or in "levels").

Figure 5:
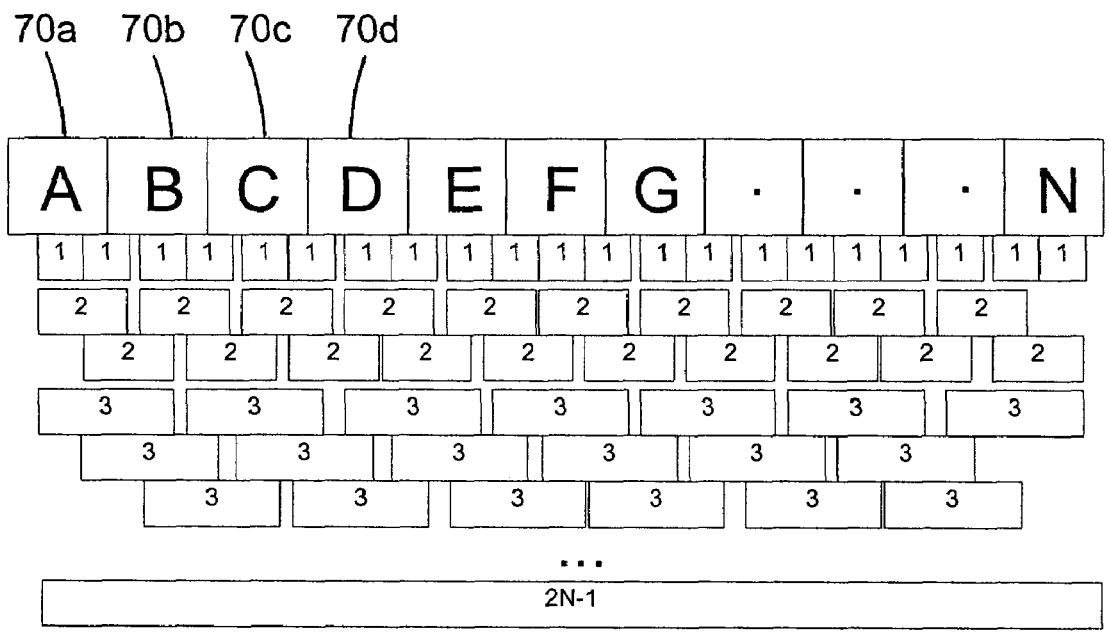
FIG. 5 illustrates an exemplary passphrase with enhanced breadth calculations for plaintext authentication according to the present invention showing the dwell and flight times between adjacent characters, between every third character, between every fourth character, and between a breadth of "2N−1".

As shown in FIG. 5, this means that not only does the present invention analyze the time it takes a user to type between adjacent characters in a passphrase (e.g., "A" 70a and "B" 70b), but it also tracks the time it takes for the user to type between every third character (e.g., "A" 70a and "C" 70c), then every fourth character (e.g., "A" 70a and "D" 70d), and all the way to a breadth of "2N−1".

Generally, the larger the sample size, the better the template. Traditionally, all biometric technologies rely on a minimum enrollment set of "S" samples to generate a verification template. However, the present invention utilizes adaptive template technology. The adaptive template technology expands this paradigm to allow samples to be dynamically added to the verification template. This provides two advantages. Specifically, since the sample size "S" is ever increasing, the template gets more secure or stronger, and over time, the template will adapt to long-term changes in typing behavior, possibly eliminating the need to re-enroll.

The fifth act in the method for providing computer-based authentication utilizing keystroke biometrics is nonce profiling 60. Nonce profiling 60 utilizes an algorithm that is explained hereinafter. It is based on the cumulative characteristics between any number of sequential characters. In speech technology, a specific discernable piece of speech is known as a "nonce". In this realm, a nonce could also be used to refer to a specific discernable pattern between any two (or N) keystrokes.

Although many existing algorithms use a template based on the entire passphrase 70, the nonce profiling 60 act takes existing and past enrollment data, broken up into nonces, and re-assembles them for a new passphrase (if there are enough nonces available to do so). Theoretically, when a user changes his/her passphrase, he/she may not need to re-enroll because the nonce profile can auto-generate a template from an existing library. Nonce profiling also provides the possibility to migrate template data as tri-graphs from one algorithm to another, such as BioPassword®.

The combination of the prior two feature sets allows users, over time, to avoid re-enrolling because the initial template (i.e., template creation 30) is created from nonces, and the template is refined via adaptive updates (i.e., template updates 50). This creates a new breed of biometric implementations, known as auto-enrollment extensions.

In alternative embodiments of the present invention, this architecture may be applied to various hardware and software platforms because of the computer environments. Although the architecture itself is defined to be object-oriented, conventional programming methods may be used to emulate both the object-oriented function overloading techniques. Products may be built on this engine such as bioChec JAVA! and bioChec GINA! available from bioChec of Stony Point, N.Y. bioChec JAVA! implements the technology as a Java applet/servlet pair to offer OS-independent web-based authentication. bioChec GINA! implements the technology as an extension to existing Windows® GINA authentication. Because GINA defines a focal point for all Windows®-sanctioned graphical terminal access, it protects any area the standard Microsoft® GINA would protect.

In another alternative embodiment, integration with single-sign-on solutions (hereinafter "SSO") is used. This embodiment implements the bioChec JAVA! bean in an applet. The applet is designed for integration into existing SSO products. For example, adding an extension to the standard Netegrity SiteMinder® Forms Credentials Controller is an option. On the back-end, the present invention enhances the srnAuthForm policy handler with its bioChecKey Engine. The present invention can be used in various ways. For example, the present invention can be used to secure product registration. A new paradigm may be added to software licensing and registration procedures. The secure licensing and registration procedures will preclude piracy, and create an audit trail for any piracy breaches.

As a simple scenario and an example, a user purchases a software package online. Within the purchase process, the user is asked to enroll online and produce a biometric (keystroke-dynamics-based) signature. The user receives a single-use installation key. Upon installing the actual software, the user is asked to verify their signature against this key for signature verification 40.

The signature verification 40 act destroys the original template and produces a runnable license tied to a combination of the specific installation (e.g., hard disk serial number, CPU serial number, NIC address, MAC address, etc.) and user signature Hash. In the case where the user saves the single use key and re-uses it on installations outside their end-user license agreement limit, the software activation, containing the user's signature hash, becomes electronic forensic evidence of the breach. This means, the signature hash created by this keystroke biometric algorithm can prove both identity and non-repudiation of the user who executed the licensing mechanism (which occurred during the software installation).

The present invention may also be integrated with online education. The present invention will ensure that a person enrolled in online education is the user logging onto the online course materials and also the only person logging into an online test. Nonce profiling 60 will provide capabilities to verify the user against non-passphrase areas such as essay answers. The present invention may also be integrated into file encryption, such as AxCrypt (distributed by AxonData, SE). As an extension of the bioChec GINA!, additional hooks apply this technology to standard Windows® NTFS EFS (encrypted file system) protection schemes. The present invention is also integrated into SSH for UNIX access. Unlike Windows®, most UNIX implementations provide many methods of access, so biometric-based logins only work when these access points are limited or centralized. Many organizations use one of two methods to limit their login exposure. The first method is to use extensive firewall rules in conjunction with RADIUS applications. The second method is to block off all non-essential ports and use SSH as a proxy for the remaining access. The present invention works with the second protection method because it centralizes all logins to a single protocol.

The present invention may also be integrated into RADIUS by enhancing existing RADIUS protocols. This allows ISPs to offer a more secure level of VPN login for existing customers.

The following Table A is a "Variable Legend" for the algorithms that are used in performing the method for gathering user keystroke timings, analyzing and abstracting the timings data into a non-repudiated template against which future keystroke data timings are verified. In addition, a detailed description of how the templates are created 30, signatures are verified 40, and the scoring is determined is provided hereinafter.

TABLE A

VARIABLE LEGEND

S = number of samples given
N = length of passphrase in keystrokes
Z = number of passphrase fields
CP = Calculation Point
TCP = Total Calculation Points
TCP:b = TCP only for a particular level
CP:b = Specific CP for an index within a level
VAR = variance
STDDEV = standard deviation
AVG = Mean (Average)
PERCERR = Percent Error
TS = timing scale
B = Breadth (aka Level) number of linear timings skipped for differential calculations
WT = Weight for an index normalized over the entire passphrase
WT:b = Weight normalized within a level
MFW = Multiplication factor for weighting
MFW:b = MFW within a particular level
ED = explicit deviance of a value to a VAR
WD = explicit deviance with WT applied
WD:b = explicit deviance with WT:b applied
TWD = total weighted deviance
TWD:b = total weighted deviance for a particular level
LD = leveled deviance
LD:b = leveled deviance for a particular level
RAW = raw score
TSCORE = translated score After the first act of data capture 20 is performed in the method for providing computer-based authentication utilizing keystroke biometrics, the second act of template creation 30 from the captured or enrollment data 20 is performed.

The act of creating a template 30 includes calculating a set of "levels" to be $N-1$ (where N is the length of keystrokes in the specific field) for each passphrase field. The MEAN, VAR, STDDEV and PERCERR for each Calculation Point (hereinafter "CP") over the captured Samples (hereinafter "S") are calculated. Enhancing the effect of consistent keystroke patterns over inconsistent patterns is done through "normalized weighting." Consistency of a specific timing is determined by the percent error calculation (over a number of samples) as compared with the percent error calculation for other timings in the captured data. (Note: Because the consistency is calculated relative to the specific captured dataset, the same timing presented in a different capture set will result in a different consistency rating. This "feature" prevents the creation of faux template data from disparate capture datasets.) The Normalize Weighting for each CP, based on spread from largest PERCERR (where WT:x is given a lowest value of 1) to smallest PERCERR (where WT:y is given highest value of TCP/2), is calculated. The Normalize Weighting, within each level based on spread from largest PERCERR (where WT:b:x is given lowest value of 1) to smallest PERCERR (where WT:b:y is given highest value of TCP:b/2), is calculated. The MFW as the sum of all weights for the entire passphrase is calculated. The MFW:b, as the sum of all weights within a particular level, is calculated. The template storing for each CP: MEAN, STDDEV, PERCERR, WT, WT:b is created. At each breadth level, the MFW:b is stored. (Breadth defines the number of linear timings skipped for differential calculations. A grouping of all differential calculations with the same breadth is known as "breadth level".) At the highest level, the MFW and Timing Scale, used for calculations, are stored. The VAR is not stored to prevent artificial creation of signatures.

The weighting is a relation of the PERCERR values across the entries in the passphrase 70 only. Weighting gives higher validity to consistent typing values than inconsistent typing values. Thus, it is always the consistency, not the speed, at which one types which affects the final outcome.

The template is updated from signature data as additional typing is received. The timing is adjusted to match the template timing scale. For each signature CP and template MEAN, STDDEV and PERCERR, a new MEAN, VAR, STDDEV and PERCERR are calculated given the formula in the "Incremental STDDEV" section. The Normalize Weighting of each CP is recalculated. The Normalize Weighting within each level is recalculated. The MFW as the sum of all weights for the entire passphrase is calculated. The MFW:b as the sum of all weights within a particular level is calculated. The template storing for each MEAN, STDDEV, PERCERR, WT, WT:b is recreated. The MFW:b is stored at each breadth level. At the highest level, the MFW is stored.

The next act or third act in the method for providing computer-based authentication utilizing keystroke biometrics is signature verification 70. The act of signature verification 40 includes adjusting the timing to match the template timing scale (hereinafter "TS"). The explicit deviance (hereinafter "ED") for each CP in the signature is calculated as the difference from the template variance over the STDDEV. The weighted deviances (i.e., WD and WD:b) for each CP in the signature are calculated as the ED*WT and ED*WT:b, respectively. The total weighted deviances (hereinafter "TWD and TWD:b") are calculated as the sum of all WD and WD:b, respectively. The leveled deviances (hereinafter "LD and LD:b") are calculated by dividing the WD/MFW and WD:b/MFW:b, respectively. The RAW score is the calculated average of the master leveled deviances (hereinafter "LD") and all the breadth leveled deviances (hereinafter "LD:b").

The act of verifying the score is performed. The raw score is interpreted as giving a higher confidence match as the value approaches (0) zero. A translated or scaled score inverts this value after adjusting for a threshold using the following formula: scale*(threshold−score)/threshold. Although a score closer to zero is an indication that the user is the user who created the template, a perfect score is almost impossible and theoretically improbable. Thus, a perfect score (or a score close to perfect) is an indication that the sample data is replayed; thus is considered a fraudulent attempt and rejected.

For multi-field passphrases, each field is calculated separately and the least confident score is returned. Although an unauthorized user may be able to mimic a certain single field, it is improbable that an unauthorized user can mimic multiple fields; hence, the probability that an unauthorized user can mimic fields decreases with each additional field.

The fifth act in the method for providing computer-based authentication utilizing keystroke biometrics is nonce profiling 60. The act of nonce profiling™ 60 includes adjusting the timing to match the template timing scale. For each passphrase field, the set of "levels" is calculated to be N−1 (where N is the length of the specific field).

For a new profile, the MEAN, VAR, STDDEV and PERCERR are calculated for each Calculation Point (CP) over number of Samples (S). For an existing profile, a new MEAN, VAR, STDDEV and PERCERR for each Calculation Point (CP) are calculated using the "Incremental STDDEV" formula.

After calculating the MEAN, VAR, STDDEV and PERCERR for a new or existing profile, the template storing for each CP: MEAN, STDDEV, PERCERR and Timing Scale (TS) is calculated. The VAR is not stored to prevent artificial creation of signatures. In addition, the nonce is stored and consists of the following indexing data: 1) the Timing Point 1 having the Key Value, Shift State, and the Press/Release Flag; 2) the Timing point 2 having the Key Value, Shift State, Press/Release Flag; 3) Breadth of timestamp interval; 4) Positional Flags to indicate the start of word boundary, end of a word boundary, and start on even/odd boundary template creation from the nonce profile.

The desired passphrase for profile entries based on the indexing data is analyzed. A determination is made as to the existence of a critical number of profiles and the existence of a sufficient number of samples in each profile. The MEAN, VAR, STDDEV and PERCERR from the profile are used to weight each Calculation Point (CP) over number of Samples (S) in the profile. Normalize Weighting of each CP based on spread from largest PERCERR (where WT:x is given lowest value of 1) to smallest PERCERR (where WT:y is given highest value of TCP/2) is performed. Normalize Weighting within each level based on spread from largest PERCERR (where WT:b:x is given lowest value of 1) to smallest PERCERR (where WT:b:y is given highest value of TCP:b/2) is performed. The MFW as the sum of all weights for the entire passphrase is calculated. The MFW:b as the sum of all weights within a particular level is also calculated. The template storing for each CP: MEAN, STDDEV, PERCERR, WT, WT:b are created. At each breadth level, the MFW:b is stored. At the highest level, the MFW and Timing Scale (TS) used for calculations are stored. The VAR is not stored to prevent artificial creation of signatures. The weighting is a relation of the PERCERR values across the entries in the passphrase only. Weighting for a particular nonce changes depending on the passphrase it is used in.

There is an Incremental STDDEV Formula according to another feature of the present invention. The STDDEV (N+1) algorithm is used to support "biased"(sample-based) and "non-biased" (population-based) calculations. The Formula Key for the calculations is as follows: D=sample data; oN=old sample size; oM=old mean; oV=old variance; oS=old std dev; nN=new sample size; nM=new mean; nV=new variance; and nS=new standard deviation stddev. The following calculations are performed:

New mean (nM) calculation:

$$nM = \frac{((oM*oN)+D)}{(nN)}$$

Original variance (oV) calculation:

$$oV = pow(oS,2)$$

New variance (nV) calculation:

$$nV = \frac{oN*(pow(oM-nM,2)+oV))+pow(D-nM,2)}{(nN-1)}$$

To calculate the variance using the "biased" method, the only difference calculation is that the denominator (nN−1) is replaced with just (nN).

New standard deviation nS) calculation:

$$nS = SQRT(nV)$$

Accordingly, the present invention provides a novel system and method for gathering various keystroke parameters, such as timing, and for analyzing and abstracting the data into a fail-safe template against which future keystroke timings can be compared and positively verified.

Modifications and substitutions by one of ordinary skill in the art are considered to be within the scope of the present invention, which is not to be limited except by the following claims.

What I claim is:

1. A method for providing computer-based authentication utilizing absolute keystroke timing biometrics, the method comprising the acts of:
   obtaining a first absolute keystroke timing data of a user while the user types a passphrase;
   responsive to said obtained absolute keystroke timing data, analyzing and abstracting the absolute keystroke timing data into a keystroke timing data template;
   obtaining a second and subsequent absolute keystroke timing data of a user while the user types a passphrase and responsive to said received second and subsequent absolute keystroke timing data, merging said second and subsequent absolute keystroke timing data with said keystroke timing data template to create an updated, merged keystroke timing data template;
   verifying said second and subsequent absolute keystroke timing data against said updated, merged keystroke timing data template; and
   performing nonce profiling of the absolute keystroke timing data and the second and subsequent absolute keystroke timing data and configuring the nonce profiling into a new passphrase.

2. The method according to claim 1 further including the acts of receiving said second and subsequent absolute keystroke timing data; and updating said keystroke timing data template with the second and subsequent absolute keystroke timing data.

3. The method according to claim 2 wherein the absolute keystroke timing data and the second and subsequent absolute keystroke timing data include a serialized set of keystroke timings.

4. The method according to claim 3 wherein said serialized set of keystroke timings is selected from the group consisting of any timing differential between one key's depression and any key's release, one key's depression to any other key's depression, one key's release to any other key's depression, and one key's release to any other key's release.

5. A method for providing computer-based authentication utilizing absolute keystroke timing biometrics, the method comprising the acts of:
   predetermining a passphrase for plaintext authentication;
   typing the predetermined passphrase for plaintext authentication;
   responsive to said act of typing, deriving absolute keystroke characteristics including a plurality of initial typing data timings, wherein said keystroke characteristics are variable;
   responsive to said act of deriving keystroke characteristics, obtaining a plurality of initial absolute typing data timings, abstracting the initial absolute typing data timings into a template for verification at a later time;
   receiving additional typing and determining the absolute typing data timings of said additional typing;
   responsive to said act of receiving additional typing data timings, verifying the additional typing data timings using said initial typing data timings;
   responsive to said act of verifying, updating said existing template by merging the additional data timings as a signature to the existing template if the verification is approved, thereby increasing the number of data timings in the template;
   breaking down the additional typing data timings of the additional typing into nonces; and
   responsive to said breaking down of said additional typing data timings, reassembling the nonces into a new passphrase.

6. The method according to claim 5 wherein the keystroke characteristics include any timing differential between one key's depression and any key's release, one key's depression to any other key's depression, one key's release to any other key's depression, and one key's release to any other key's release.

7. The method according to claim 6, further including the act of calculating total calculation points.

8. The method according to claim 5, responsive to said abstracting act, further comprising the acts of:
   calculating a set of levels to be N−1, wherein N is the length of the passphrase;
   responsive to said calculating act, calculating a mean average, variance, and standard deviation for each calculation point over a number of samples;
   determining a normalize weighting at each said set level based on a spread from a largest percent error to a smallest percent error;
   calculating the multiplication factor for weighting as a sum of all weights for the entire passphrase;
   calculating the multiplication factor for weighting as a sum of all weights for each level in the passphrase;
   creating a template by storing each calculation point, mean average, standard deviation, percent error, weight for an index normalized over the entire passphrase, and weight for an index normalized within the level;
   responsive to said act of calculating the multiplication factor for weighting as the sum of all weights for the each level in the passphrase, storing the multiplication factor for weighting as the sum of all weights for each level in the passphrase at each breadth level; and
   responsive to said act of calculating the multiplication factor for weighting as a sum of all weights for each level in the passphrase, storing the multiplication factor for weighting as the sum of all weights for the entire passphrase and the data timing at the highest level.

9. The method according to claim 6 wherein the total number of timings are determined as 2N−1, and wherein N is a number of key presses.

10. The method according to claim 8, further including the acts of:
    adjusting the additional typing data timings to match the data timings in the template;
    calculating a new mean average, variance, standard deviation, and percent error using an incremental standard deviation formula;
    recalculating the normalize weighting within each level;
    recalculating the normalize weighting of each calculating point;
    recalculating the multiplication factor for weighting as the sum of all weights for the entire passphrase;

recalculating multiplication factor for weighting as the sum of all weights for each level in the passphrase;

recreating the mean average, standard deviation, percent error, weight for the index normalized over the entire passphrase, and the weight for the index normalized within the level for the template;

storing the multiplication factor for weighting as the sum of all weights for the each level in the passphrase at each breadth level; and storing the multiplication factor for weighting as the sum of all weights for the entire passphrase and the data timing at the highest level.

11. The method according to claim 5 wherein the verifying act includes the acts of:

interpreting a raw score as a value, wherein the smaller the value, the higher the confidence;

responsive to said interpreting act, calculating a threshold; and inverting the value to obtain a translated score.

12. The method according to claim 5 further comprising the act of refining the template with additional nonces.

13. The method according to claim 5 wherein the method is performed using JAVA applet/servlet pair technology.

14. The method according to claim 5 wherein the method is performed using GINA technology.

15. The method according to claim 5 further including the act of requiring purchasers of products to perform the typing act.

16. The method according to claim 5 further including the act of requiring a person enrolled in online educational programs to perform the typing act prior to accessing online educational materials.

17. The method according to claim 5 further including the act of enhancing RADIUS protocols with the method.

18. A method for providing computer-based authentication utilization keystroke biometrics, the method comprising the acts of:

obtaining a first absolute keystroke timing data of a user while the user types a passphrase, wherein said absolute keystroke timing data is selected from the group consisting of any timing differential between one key's depression and any key's release, one key's depression to any other key's depression, one key's release to any other key's depression, and one key's release to any other key's release;

responsive to said obtained absolute keystroke timing data, analyzing and abstracting the absolute keystroke timing data into a keystroke timing data template;

obtaining a second and subsequent absolute keystroke timing data of a user while the user types a passphrase, and responsive to said received second and subsequent absolute keystroke timing data, merging said second and subsequent absolute keystroke timing data with said keystroke timing data template to create an updated, merged keystroke timing data template;

verifying said second and subsequent absolute keystroke timing data against said updated, merged keystroke timing data template;

performing nonce profiling of the absolute keystroke timing data and the second and subsequent absolute keystroke timing data; and configuring the nonce profiling into a new passphrase.

19. A method for providing computer-based authentication, the method comprising the acts of:

obtaining a first keystroke timing data sample of a user;

responsive to said obtained first keystroke timing data sample, analyzing and abstracting the first keystroke timing data sample into a non-repudiated data sample template;

obtaining a second and subsequent keystroke timing data sample of a user while the user types a passphrase and responsive to said received second and subsequent keystroke timing data sample, merging said second and subsequent keystroke timing data sample with said non-repudiated keystroke data sample template to create an updated, merged non-repudiated data sample template;

verifying said second and subsequent keystroke timing data samples against the non-repudiated data sample template to determine consistency or inconsistency between the subsequent keystroke timing data samples as compared to the non-repudiated data sample template; and performing nonce profiling of the non-repudiated data sample template and the second and subsequent keystroke timing data sample and configuring the nonce profiling into a new passphrase.

* * * * *